Figure 1:
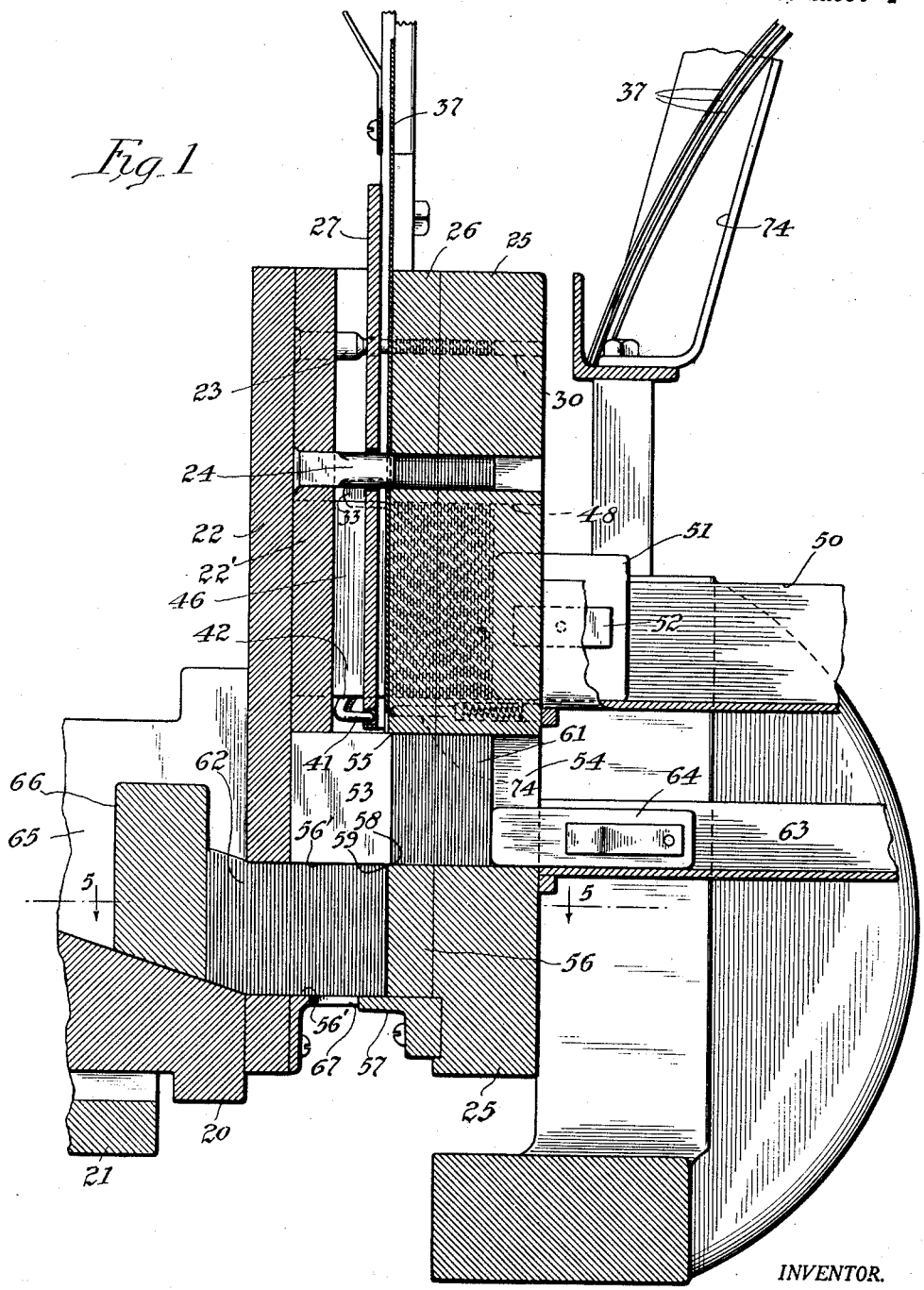

Aug. 18, 1931.   O. A. PEARSON   1,819,481
MACHINE FOR CUTTING MAGNETIC CIRCUIT LAMINÆ
Filed July 12, 1928   4 Sheets-Sheet 1

INVENTOR.
BY Oscar A. Pearson
ATTORNEY.

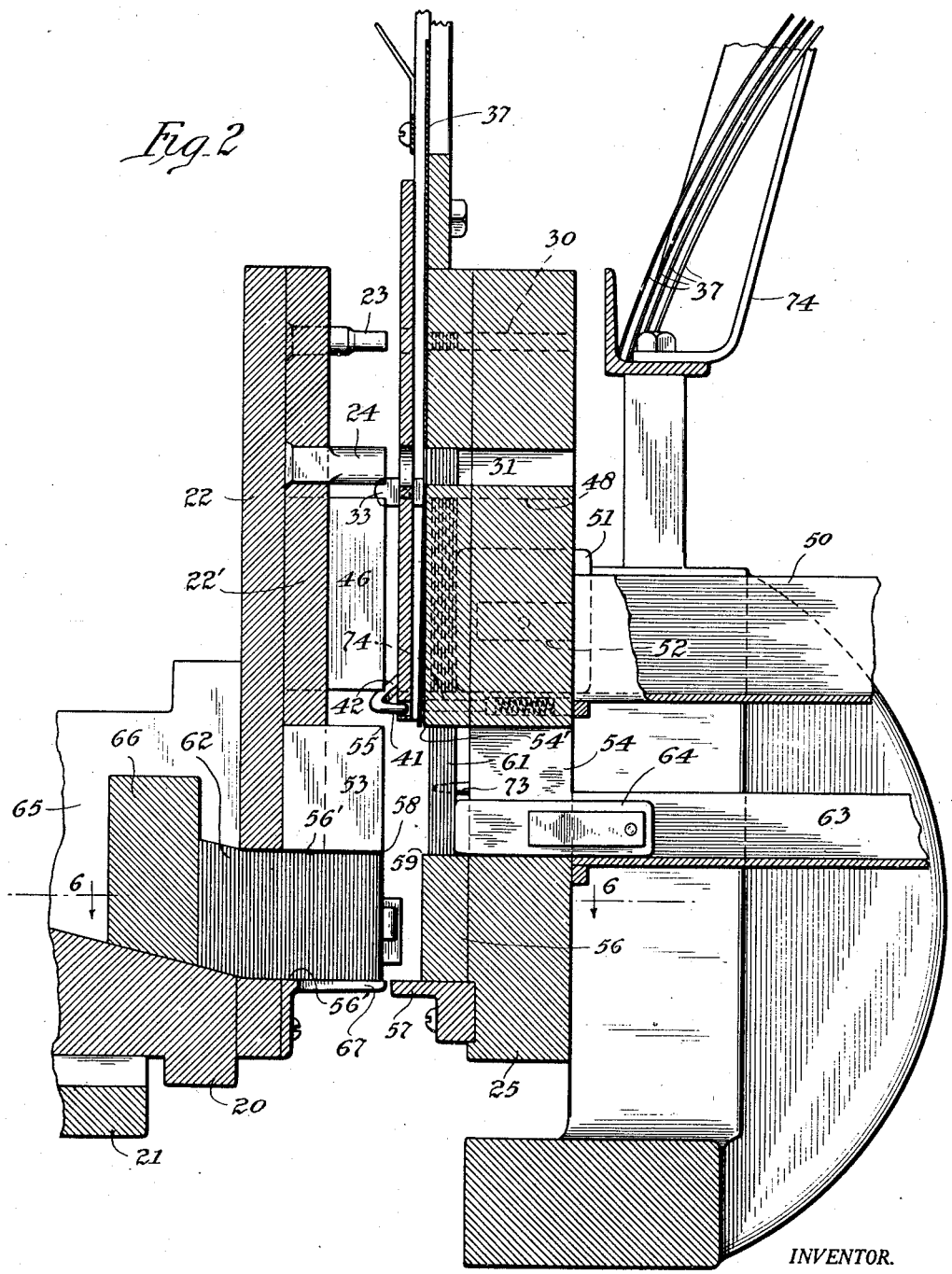

Aug. 18, 1931.  O. A. PEARSON  1,819,481
MACHINE FOR CUTTING MAGNETIC CIRCUIT LAMINÆ
Filed July 12, 1928  4 Sheets-Sheet 3
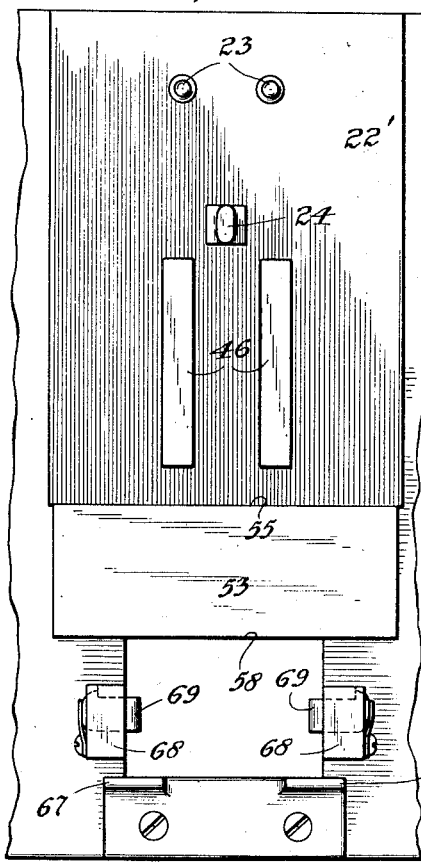
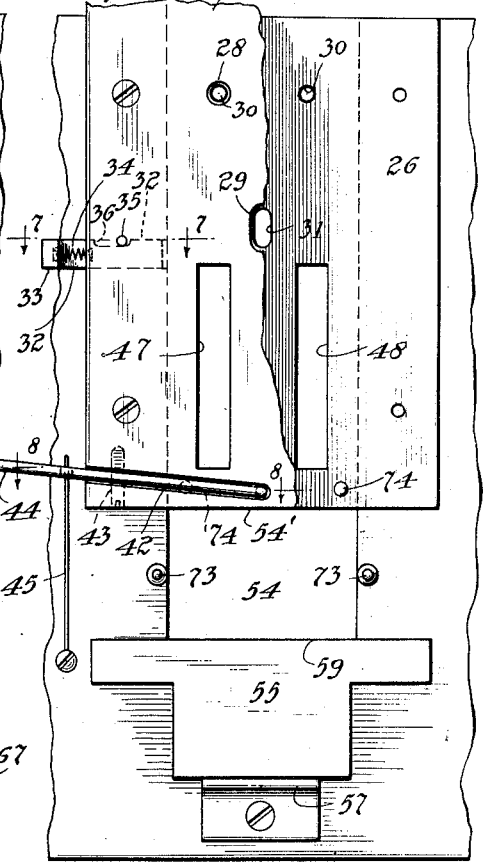
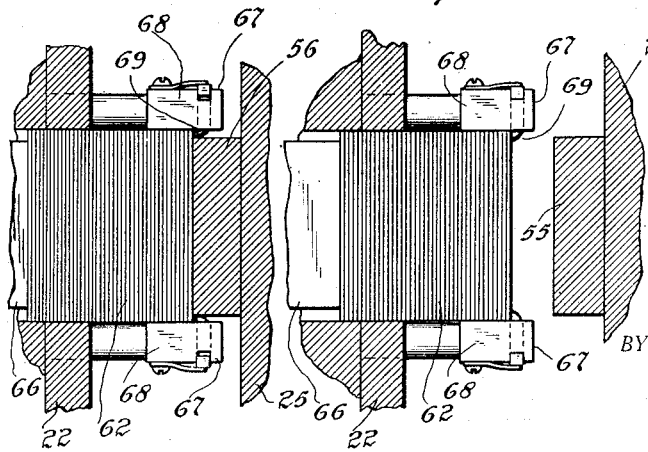
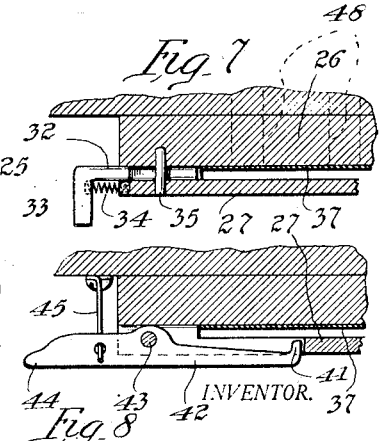
INVENTOR.
Oscar A. Pearson
BY Brayton Richards
ATTORNEY.

Aug. 18, 1931.                O. A. PEARSON                1,819,481
          MACHINE FOR CUTTING MAGNETIC CIRCUIT LAMINÆ
                    Filed July 12, 1928      4 Sheets-Sheet 4
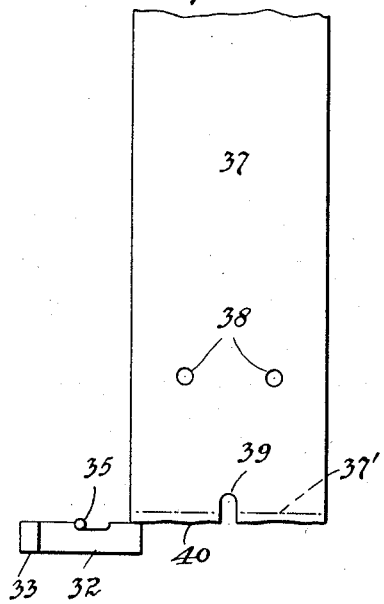
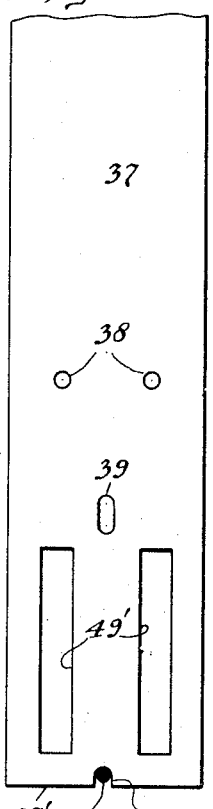
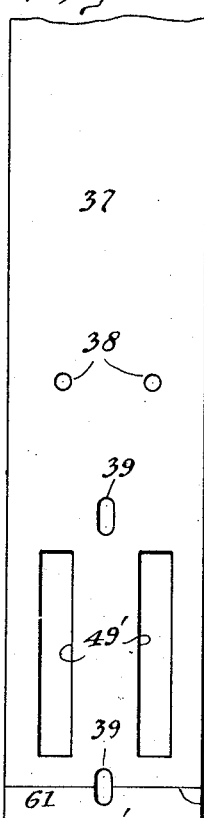
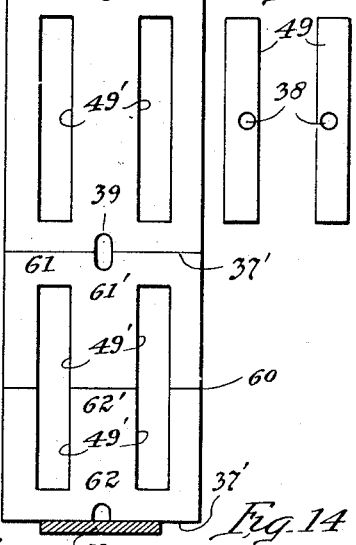
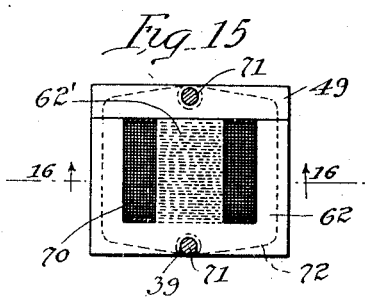
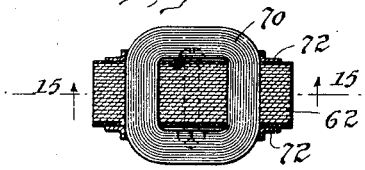
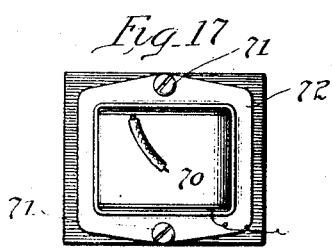
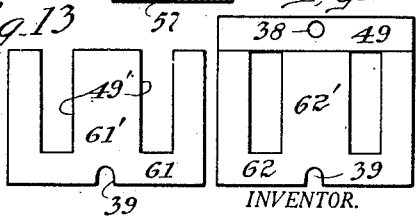
INVENTOR.
BY  Oscar A. Pearson
    Brayton Richards
                 ATTORNEY.

Patented Aug. 18, 1931

1,819,481

UNITED STATES PATENT OFFICE

OSCAR A. PEARSON, OF OAK PARK, ILLINOIS, ASSIGNOR TO THORDARSON ELECTRIC MANUFACTURING COMPANY, OF CHICAGO, ILLINOIS, A CORPORATION OF ILLINOIS

MACHINE FOR CUTTING MAGNETIC CIRCUIT LAMINÆ

Application filed July 12, 1928. Serial No. 292,299.

The invention relates to improvements in machines for cutting magnetic circuit laminæ for use in the manufacture of electrical coils, the present invention constituting an improvement upon the machine illustrated and described in the patent of Chester H. Thordarson, dated October 19, 1920, No. 1,356,178.

The primary object of the present invention is to provide certain improvements on the machine disclosed in the above mentioned patent thereby endowing said machine with improved and more extended capacities.

Another object of the present invention is to provide such a machine having the capacity of providing members for the formation of laminæ for electrical coils having therein suitable means facilitating assembling and securing of said laminæ in the coils.

Another object of the invention is to provide a machine of the class indicated which is of simple construction and capable of rapid operation thereby endowing the same with capacity for large daily output.

Other objects will appear hereinafter.

In the drawings:—

Fig. 1 is a vertical section of the operative parts of a machine embodying the invention, showing only such portions of the co-operating punch press as is necessary to illustrate the co-operation of my improvements therewith;

Fig. 2, a similar section showing the operative parts in different positions;

Fig. 3, a face view of one of the die members of the machine;

Fig. 4, a face view of the other die member of the machine;

Fig. 5, a partial section taken substantially on line 5—5 of Fig. 1;

Fig. 6, a partial section taken substantially on line 6—6 of Fig. 2;

Fig. 7, an enlarged partial section taken substantially on line 7—7 of Fig. 4;

Fig. 8, a partial section taken substantially on line 8—8 of Fig. 4;

Fig. 9, a diagrammatic face view illustrating the end of the strip of metal operated upon by the machine at the end of the first stage of operation of the machine in starting the same;

Fig. 10, a similar view showing the condition of the end of the strip of metal at the end of the second stage of operation of the machine;

Fig. 11, a view showing the condition of the end of the strip of metal at the end of the final operation of the machine;

Fig. 12, a view showing two bars removed from the strip of metal in the second stage of operation of the machine;

Fig. 13, a view of one of two E-shaped plates formed by the normal operation of the machine;

Fig. 14, a view of the other of the two E-shaped plates shown in conjunction with a co-operating bar and constituting a complete lamina formed by the machine;

Fig. 15, a transverse section of a completed coil provided with laminæ formed on the machine, said section being taken substantially on line 15—15 of Fig. 16;

Fig. 16, a section taken substantially on line 16—16 of Fig. 15; and

Fig. 17, a top plan view corresponding with Fig. 16.

The preferred form of construction as illustrated in the drawings comprises a suitable punch press, such as is employed in the machine of said prior patent, and involving a reciprocating plunger or ram 20 guided in suitable ways on the frame 21 of the punch press and operated from any suitable source of power. The head 20 carries the die plates 22 and 22', as indicated, said die plates carrying the punch members 23 and 24, as shown. The punch members 23 are arranged as indicated symmetrically on opposite sides of the central line of the die and on a transverse line thereof. The punch member 24 is arranged on the longitudinal medial line of the die.

Co-operating with the reciprocating die members is a stationary die plate 25 mounted on the frame of the punch press and carrying on its face a die plate 26 as shown. A combined stripper and guide plate 27 is arranged over the die plate 26 to co-operate therewith. The stripper plate 27 is provided with enlarged circular openings 28 to permit of the free passage of the punch members 23 which are, in this instance, also circular but of somewhat smaller diameter. Likewise, the stripper plate 27 is provided with an opening 29 for the free passage of the punch member 24 which in this instance, is vertically elongated or oblong in form, and the opening 29 being somewhat larger than the active punch element. The die plates 26 and 25 are provided with co-operating die openings 30 and 31 to co-operate with and receive the punch members 23 and 24 as will be readily understood.

A spring held inwardly slidable stop bar 32 is mounted, as indicated in Figs. 4 and 7, between the plates 26 and 27, said stop bar being provided at its outer end with an outwardly turned handle 33 for the convenience of manipulation by the operator of the machine. The stop bar 32 is normally held in outward or inoperative position by means of a compression spring 34, and a stop pin projects through a notch 36 in the upper edge thereof to limit the movements of the stop bar. The stop bar 32 is operated by being depressed or pushed inwardly by the operator of the machine, so that the inner upper edge of the stop bar rests in the path of the strip of metal 37 inserted in the machine by the operator and being operated on by the machine. The upper edge of the stop bar 32 is so positioned relatively to the punch members 23 and 24 that said punch members will form the holes 38 and 39 in the strip 37 as indicated in Fig. 9, upon initial operation of the machine. It will be noted that the holes 38 are thus formed symmetrically on a transverse line of the strip equally spaced on opposite sides of the central medial line thereof, and the hole 39 is formed centrally at the edge of the strip so as to constitute a notch in the forward edge 40 of the strip. As shown, the forward edge 40 of the strip may be somewhat iregular in form and for this reason the stop 32 is positioned slightly in advance or below the normal true edge, indicated by the dotted line 37' for a purpose to be hereinafter explained.

The members thus far described constitute what I term the first stage of the machine serving simply to form the openings 38 and 39 in the strip 37 when said strip is inserted by the operator to rest against the stop 32 which is normally depressed by the operator for the purpose.

Upon release of the stop 32 by the operator, the spring 34 automatically withdraws the same leaving the passageway free for the further insertion of the strip which is thereupon done by the operator until the notch 39 engages a stop pin 41 positioned further down in the machine and at the end of what is termed the second stage thereof.

The stop pin 41 is carried by the inner end of a lever 42 fulcrumed on the pin 43 and having a laterally projecting handle portion 44 and normally held in retracted or inoperative position by means of a wire spring 45 as best shown in Figs. 4 and 8.

The arrangement is such that the stop pin 41 will normally be held in retracted or inoperative position by means of the spring 45 but can be set by the operator to engage the notch 39, as indicated in Fig. 10, and stop and position the strip for what I term the second stage of operation of the machine.

For this second stage of operation of the machine the die plates 22 and 22' are provided with two vertically elongated symmetrically positioned punch or male die members 46 co-operating with similar slots 47 in the stripper plate 27 and with similar female die openings 48 in the die plates 26 and 25 and whereby upon operation of the punch press bars or strips 49 will be punched from the strip 37 to form parallel equally spaced symmetrical slots 49' in the said strip, the said bars 49 including centrally, as shown in Fig. 12, the holes 38 previously punched by the punch members 23, as will be readily understood and whereby the bars 49 are produced with central openings 38 for a purpose which will presently appear. Co-operating with the openings 48 is a supporting tray 50 carrying a friction block 51 slidable therein and having lateral friction springs 52 so that as the bars 49 are thus removed from the strip 37 they are delivered into the tray 50 by the normal operation of the machine, as will be readily understood.

The die plates 22 and 22' carry another punch or male die member 53 arranged opposite an opening 54 in the die plate 25. The upper edge 55 of the die member 53 co-operates with the lower edge 54' of the die plate 26 to form the transverse cut or trim 37' in the strip 37 at each operation of the punch press.

The stop 41 is so positioned relatively to the parts that at the next successive operation of the punch press, the bars 49, the slots 49' and the trim edge 37' will be formed, said operations constituting what I term the second stage of the machine. It will be noted that the co-operation of the stop 32 with the stop 41 is such that this causes a trimming off of a slight end of the strip in this stage and whereby the trimmed edge 37' is necessarily accurately positioned with reference to the other features of both the strip and the die members.

The last stage of the machine is substantially the same as the last stage of the machine disclosed in said above mentioned prior patent to Thordarson. To this end the die member 25 is provided with a male die member or punch 56 co-operating with a die opening 56' in the die member on the punch press head 20. An accurate stop 57 is arranged on the die member 25 to position the end of the strip properly for operation of all of the die members and so that when the incoming end of the strip is properly trimmed at 37', the previously formed parts of the strip will be accurately positioned thereon for co-operation by the cutting elements in the final stage. These cutting elements consist primarily of the upper edge 55 of the die member 53 which co-operates as indicated above with the lower edge 54' of the die plate 26 to constitute a cutting element for accurately trimming the end of the strip in the second stage of insertion thereof and also for accurately cutting off the end of the strip at each subsequent operation of the machine.

The lower edge 58 of the die member 53 and the upper edge 59 of the die member 56 constitute cutting elements which accurately sever the strip end along the transverse line 60 of Fig. 11 thereby forming the end of the strip into two identical E-shaped plates 61 and 62 each provided with a central bar or projection 61' and 62' as shown in Figs. 11, 13 and 14.

The plates 61 pass one way through the opening 54 into a tray 63 containing a friction block 64 and the plates 62 pass the other way through the opening 56' and into an opening 65 in the head 20 against the resistance of a block 66 as will be readily understood.

Stop bars 67 are also provided on the die plate 22 to co-operate with the stop member 57 passing on opposite sides thereof and serving as supports for the plates 62 as they are fed through the opening 56'. The plate 22 is also provided with side arms 68 carrying spring held dogs 69 to cause the feeding of the plates 62 through the opening 56' in substantially the same manner and the same function as is performed in the Thordarson patent. By this arrangement a machine is produced which will operate at high speed and great accuracy to produce the co-operating plates 61 and 62 and the bars 49 for the formation of laminæ for electrical coils. Such a coil is illustrated in Figs. 15, 16 and 17.

As will be noted, the magnetic circuit for the coil 70 is formed by assembling the plates and bars as shown. To this end the plates 61 and 62 may be inserted in the coil from the side, the central bars 61' and 62' passing centrally into the bore of the coil. Associated with each plate is a bar 49 each plate and bar thus constituting a complete laminus of the coil. When the magnetic circuit has thus been completely built up, the cover plates 72 are then applied and the whole secured together by means of the screw bolts 71 passing through the openings 38 and 39 as indicated.

To facilitate the operation of the machine, guide pins 73 are arranged at opposite sides of the opening 54 to accurately guide the strip to its proper position on the stop 57. Likewise depressible spring held guide pins 74 are provided in the die plate 26 as best shown in Figs. 4 and 1 and 2 which serve to normally hold the lower edge of the strip 37 out from the top edge 59 of the die member 56 during feeding of said strip onto the stop 57, thereby facilitating the normal operation of the machine.

For convenience also the machine may be provided with a suitable supporting holder or bracket 74' for holding the strips preparatory to insertion in the machine.

By this arrangement a machine is provided which will produce the plates and parts for laminated electric coils with great rapidity and economy of production and which will be highly efficient in use in such coils.

While I have illustrated and described the preferred form of construction for carrying my invention into effect, this is capable of variation and modification without departing from the spirit of the invention. I, therefore, do not wish to be limited to the precise details of construction set forth but desire to avail myself of such variations and modifications as come within the scope of the appended claims.

I claim:

1. A machine of the class described comprising in combination a punch press and co-operating male and female die members arranged to operate on a strip of metal in three successive stages, the first stage comprising die members adapted and arranged to punch two holes spaced on opposite sides of the longitudinal medial line of the strip and on a transverse line and a third hole located on the dividing line between the first and second stages, the second stage comprising die members arranged to remove two longitudinal bars containing said first mentioned holes to form two longitudinal parallel slots, and the third stage comprising cutting members arranged to cut said strip transversely through said second mentioned hole and also transversely through said slots.

2. A machine of the class described comprising in combination a punch press and co-operating male and female die members arranged to operate on a strip of metal in three successive stages, the first stage comprising die members adapted and arranged to punch two holes spaced symmetrically on opposite sides of the longitudinal medial line of the strip and on a transverse line of the strip located at substantially the center of the stage and a third hole located on the longitudinal medial line of the strip and on the dividing line between the first and second stages, the second stage comprising die members arranged to remove two longitudinal bars containing said first mentioned holes to form two longitudinal parallel slots, and the third stage comprising cutting members arranged to cut said strip transversely through said second mentioned hole and also transversely through said slots.

3. A machine of the class described comprising in combination a punch press and co-operating male and female die members arranged to operate on a strip of metal in three successive stages, the first stage comprising die members adapted and arranged to punch two holes spaced on opposite sides of the longitudinal medial line of the strip and on a transverse line and a third hole located on the dividing line between the first and second stages, the second stage comprising die members arranged to remove two longitudinal bars containing said first mentioned holes to form two longitudinal parallel slots, and the third stage comprising cutting members arranged to cut said strip transversely through said second mentioned hole and also transversely through said slots; settable stops for said strip in said first and second stages; and a permanent stop for said strip arranged to engage the end thereof to position the same properly for all stages.

4. A machine of the class described comprising in combination a punch press and co-operating male and female die members arranged to operate on a strip of metal in three successive stages, the first stage comprising die members adapted and arranged to punch two holes spaced symmetrically on opposite sides of the longitudinal medial line of the strip and on a transverse line of the strip located at substantially the center of the stage and a third hole located on the longitudinal medial line of the strip and on the dividing line between the first and second stages, the second stage comprising die members arranged to remove two longitudinal bars containing said first mentioned holes to form two longitudinal parallel slots, and the third stage comprising cutting members arranged to cut said strip transversely through said second mentioned hole and also transversely through said slots; settable stops for said strip in said first and second stages; and a permanent stop for said strip arranged to engage the end thereof to position the same properly for all stages.

5. A machine of the class described comprising in combination a punch press and co-operating male and female die members arranged to operate on a strip of metal in three successive stages, the first stage comprising die members adapted and arranged to punch two holes spaced on opposite sides of the longitudinal medial line of the strip and on a transverse line and a third hole located on the dividing line between the first and second stages, the second stage comprising die members arranged to remove two longitudinal bars containing said first mentioned holes to form two longitudinal parallel slots, and the third stage comprising cutting members arranged to cut said strip transversely through said second mentioned hole and also transversely through said slots; a settable stop arranged to engage the end of said strip to position the same for said first stage, said stop being set far enough in advance to cause a small portion of said strip to protrude over into said second stage so as to be accurately trimmed in the second stage; a settable stop arranged to engage said second mentioned hole to position said strip for said second stage; and a permanent stop for said strip arranged to engage the end thereof to position the same properly for all stages.

6. A machine of the class described comprising in combination a punch press and co-operating male and female die members arranged to operate on a strip of metal in three successive stages, the first stage comprising die members adapted and arranged to punch two holes spaced symmetrically on opposite sides of the longitudinal medial line of the strip and on a transverse line of the strip located at substantially the center of the stage and a third hole located on the longitudinal medial line of the strip and on the dividing line between the first and second stages, the second stage comprising die members arranged to remove two longitudinal bars containing said first mentioned holes to form two longitudinal parallel slots, and the third stage comprising cutting members arranged to cut said strip transversely through said second mentioned hole and also transversely through said slots; a settable stop arranged to engage the end of said strip to position the same for said first stage, said stop being set far enough in advance to cause a small portion of said strip to protrude over into said second stage so as to be accurately trimmed in the second stage; a settable stop arranged to engage said second mentioned hole to position said strip for said second stage; and a permanent stop for said strip arranged to engage the end thereof to position the same properly for all stages.

7. A machine of the class described comprising in combination punch press and male and female die members arranged to operate on a strip of metal in three successive co-operating stages to provide co-operating plates; a permanent stop for the end of said strip arranged to position said strip properly for the last and the preceding stages; a settable stop positioning the strip for the first stage so as to cause protrusion of a small portion of the strip into the second stage; and a settable stop arranged to position said strip properly for said second stage to cause accurate trimming of the strip and for accurate co-operation with said permanent stop.

8. A machine of the class described comprising in combination punch press and male and female die members arranged to operate on a strip of metal in three successive co-operating stages to provide co-operating plates;

a permanent stop for the end of said strip arranged to position said strip properly for the last and the preceding stages; a settable stop engaging the end of the strip and positioning the strip for the first stage so as to cause protrusion of a small portion of the strip into the second stage and a settable stop engaging a hole formed in the first stage and arranged to position said strip properly for said second stage to cause accurate trimming of the strip and for accurate co-operation with said permanent stop.

9. A machine of the class described comprising in combination punch press and male and female die members arranged to operate on a strip of metal in successive co-operating stages; and depressible spring held guide members in and protruding from the face of one of said die members and adapted and arranged to hold the said strip out from the face of said one die member and thus prevent entanglement of the end of said strip as it is fed between said die members and to depress upon operation of the die members.

10. A machine of the class described comprising in combination punch press and male and female die members arranged to operate on a strip of metal in successive co-operating stages to provide co-operating plates, an early stage being arranged to punch holes in said strip and a later stage to cut the strip transversely into similar plates; and depressible spring held guide pins in and protruding from the face of one of said die members and adapted and arranged to hold the said strip out from the face of said one die member and thus prevent entanglement of the end of said strip as it is fed between said die members and to depress upon operation of the die members.

In witness that I claim the foregoing as my invention I affix my signature this 6th day of July, A. D. 1928.

OSCAR A. PEARSON.